(12) United States Patent
Chen et al.

(10) Patent No.: US 8,311,361 B2
(45) Date of Patent: Nov. 13, 2012

(54) DIGITAL IMAGE ENHANCEMENT

(75) Inventors: Min Chen, Hong Kong (CN); Huajun Peng, Hong Kong (CN); Guoping Qiu, Hong Kong (CN)

(73) Assignee: Hong Kong Applied Science and Technology Research Institute Company Limited, Shatin, New Territories (HK)

( * ) Notice: Subject to any disclaimer, the term of this patent is extended or adjusted under 35 U.S.C. 154(b) by 1119 days.

(21) Appl. No.: 12/195,976

(22) Filed: Aug. 21, 2008

(65) Prior Publication Data

US 2010/0046852 A1 Feb. 25, 2010

(51) Int. Cl.
*G06K 9/40* (2006.01)
*G09G 5/00* (2006.01)
(52) U.S. Cl. ....................... 382/274; 345/617
(58) Field of Classification Search .................. 382/274; 345/617; 348/254; 358/461
See application file for complete search history.

(56) References Cited

U.S. PATENT DOCUMENTS

| 5,995,656 | A | | 11/1999 | Kim |
| 6,097,849 | A | * | 8/2000 | Nevis .............................. 382/274 |
| 6,671,395 | B1 | * | 12/2003 | Ott et al. ......................... 382/137 |
| 7,170,645 | B2 | | 1/2007 | Kim et al. |
| 7,187,808 | B2 | | 3/2007 | Cho et al. |
| 7,409,083 | B2 | | 8/2008 | Yano |
| 2002/0171852 | A1 | * | 11/2002 | Zhang et al. .................... 358/1.9 |
| 2005/0013506 | A1 | | 1/2005 | Yano |
| 2007/0071350 | A1 | | 3/2007 | Lee et al. |
| 2007/0171310 | A1 | * | 7/2007 | Arici et al. ...................... 348/687 |
| 2008/0002062 | A1 | | 1/2008 | Kim et al. |
| 2008/0012992 | A1 | | 1/2008 | Arici et al. |
| 2008/0101719 | A1 | | 5/2008 | Lim et al. |
| 2009/0033682 | A1 | * | 2/2009 | Kaida et al. .................... 345/634 |
| 2009/0184915 | A1 | * | 7/2009 | Tsai et al. ....................... 345/102 |

FOREIGN PATENT DOCUMENTS

| CN | 1172312 | 2/1998 |
| CN | 101098489 | 1/2008 |
| CN | PCT/CN2008/072189 | 5/2009 |
| JP | 8-056316 | 2/1996 |
| JP | 10-210324 | 8/1998 |
| JP | 2005-039458 | 2/2005 |

OTHER PUBLICATIONS

Narendra et al. ("Real-time adaptive contrast enhancement," IEEE Transactions on Pattern Recognition and Machine Intelligence, vol. PAMI-3, No. 6, Nov. 1981, pp. 655-661).*

* cited by examiner

*Primary Examiner* — Yubin Hung
(74) *Attorney, Agent, or Firm* — Wells St. John, P.S.

(57) ABSTRACT

Enhancement of an image includes adjusting its brightness and then adjusting the contrast of the brightness adjusted image. Adjusting the brightness uses an estimation of real world luminance. Contrast adjustment involves extracting background and contrast information, adjusting the contrast information by an adjustment factor based on the background information and combining the background corrected contrast information to obtain an output image.

12 Claims, 4 Drawing Sheets

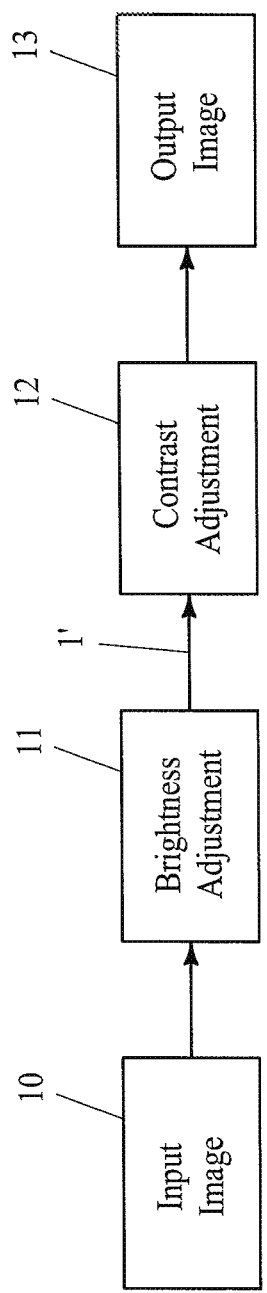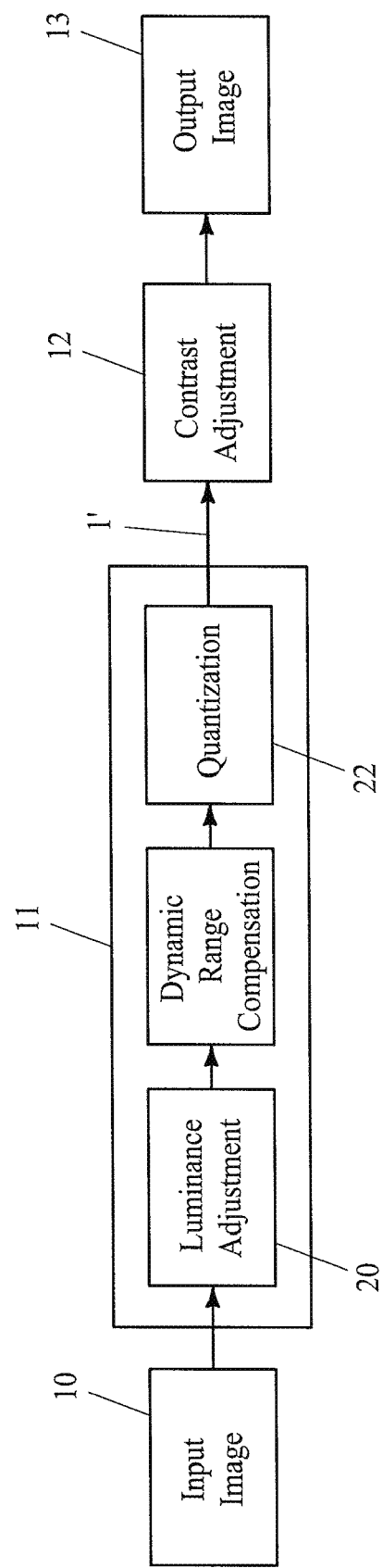

DIGITAL IMAGE ENHANCEMENT

BACKGROUND TO THE INVENTION

1. Field of the Invention

The current invention relates to digital image enhancement, and in particular to a method of enhancing the brightness and the contrast of a digital image.

2. Background Information

Digital images, either still or video, are not always captured under ideal lighting conditions. Natural lighting conditions can often be too bright or too dim and artificial lighting outside of a photographic studio often provides irregular illumination. This results in the captured image having poor visual quality. In addition modern the range of luminance in the real world is continuous in both brightness and time and can reach up to 14 orders of magnitude (10 to the power 14). The human eye can see a wide luminance range of up to 5 orders of magnitude, however most display image system only operate at 2 to 3 orders of magnitude.

Various techniques have been proposed in the art for improving or enhancing image quality. More recent methods of enhancing an image are disclosed in US patent publications US 2008/0101719 to Lim et al, US 2008/0012992 and 2007/0171310 to Arici et al and US 2007/0071350 to Lee et al. US publication 2008/0101719 to Lim, in particular, gives a good discussion on the various well known techniques for improving image quality. All of these various methods are successful in improving image quality to varying degrees. However, there is still a difference between digital images and the actual scene viewed by the human eye.

SUMMARY OF THE INVENTION

It is an object of the present invention to provide an image enhancement method that provides the public with a useful alternative to current image enhancement methods.

There is disclosed herein a digital image enhancement method for adjusting the brightness of an input image to obtain a brightness adjusted image and then adjusting the contrast of the brightness adjusted image to obtain an enhanced output image.

Adjusting the brightness of the input image preferably comprises estimating a real world luminance of the input image. The dynamic range of the adjusted image is compressed and the brightness enhanced image quantized.

Contrast adjustment preferably comprises extracting background and contrast information of the brightness enhanced image, adjusting the contrast information, and combining the background and adjusted contrast information to obtain an output image.

To extract the background and contrast information the background information may first be obtained using a low pass filter and then the background information is removed from the original image to obtain the contrast information.

The contrast information is adjusted by multiplying by a contrast adjustment factor, which is a function of the background information.

Further aspects of the invention will become apparent from the following description of a preferred embodiment of the invention.

BRIEF DESCRIPTION OF THE DRAWINGS

Exemplary forms of the present invention will now be described by way of example only and with reference to the accompanying drawings in which:

FIG. 1 is a schematic block diagram of the basic steps for image enhancement according to the invention, FIG. 2 is a schematic block diagram showing more detail of a brightness adjustment step.

DESCRIPTION OF THE PREFERRED EMBODIMENTS

The following exemplary embodiments of the present invention are given by way of example only and are not intended to limit the scope of use or functionality of the invention. The invention comprises two aspects, namely brightness adjustment and contrast adjustment, for enhancing an input image. Specific detail of each aspect is given to assist in understanding the invention. However, alternative embodiments of the invention need not comprise every step in both aspects. The skilled addressee will appreciate that the quality of an image will be enhanced by practising brightness control according to the invention with any number of alternative contrast adjustment schemes. Alternatively the image may be adequately enhanced by practising contrast adjustment after brightness adjustment of an image using any one of a number of known techniques.

FIG. 1 illustrates basic steps in digital image enhancement according to the invention. An input image 10 firstly undergoes brightness adjustment 11. The brightness adjusted image I' then undergoes contrast adjustment 12 resulting in an enhanced output image 13. FIGS. 2 through 5 illustrate in more detail each of the steps of brightness adjustment and contrast adjustment.

Figure 3:
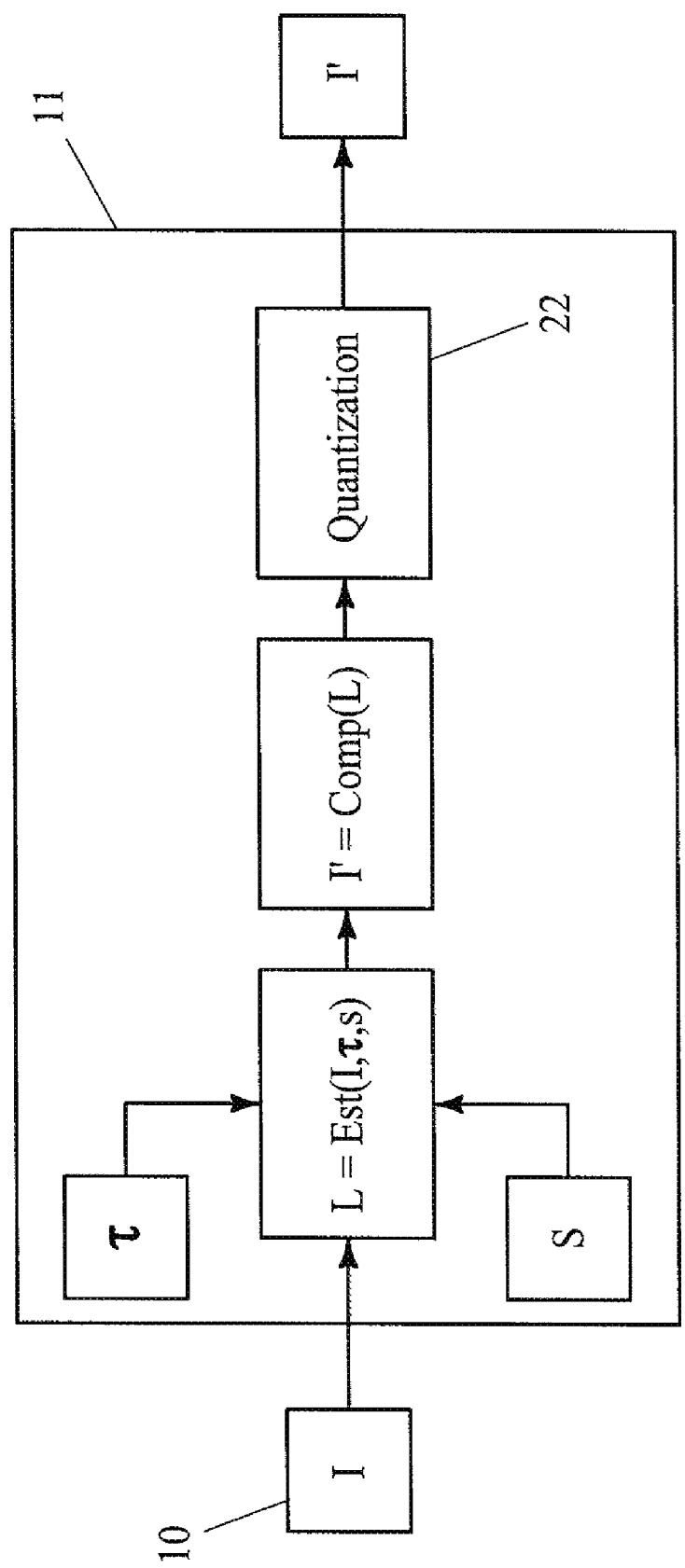
FIG. 3 is a functional block diagram of the brightness adjustment.

Referring to FIGS. 2 and 3, brightness adjustment of the input image 10 consists of adjusting the brightness of the image based in an estimated real world luminance L, and compressing and quantizing the brightness adjusted image.

The real world estimation L is a function of the input image I, a scaling factor S to adjust between an image dynamic range and the real word dynamic range, and a minimum luminance parameter $\tau$.

The dynamic range D of the input image I is:

$$D = \frac{\log(I+1)}{\log(I_{max}+1)}$$

Rearranging we get the following equation for the image I:

$$I = \text{Exp}(D \times \log(I_{max}+1)) - 1$$

If we limit the minimum luminance to $\tau$ then the adjusted dynamic range of the image becomes:

$$D_{adj} = \frac{\log[(I-\tau)+1]}{\log(I_{max}+1)}$$

Rearranging again and introducing the scaling factor S we get the following equation for the brightness adjusted image $I_{adj}$:

$$I_{adj} = \text{Exp}(D_{adj} \times S) - 1 + \tau$$

where S is the scaling factor of the real word dynamic range, and $\tau$ is the minimum luminance.

In the preferred embodiment the dynamic range of the brightness adjusted image $I_{adj}$ is compressed by a log function and quantized 22 to simulate quantization by the human eye. The log compression equation is:

$$I'=\log(I_{adj})$$

Quantization of the image is to 256 discrete values in the range 0 to 255.

Figure 4:
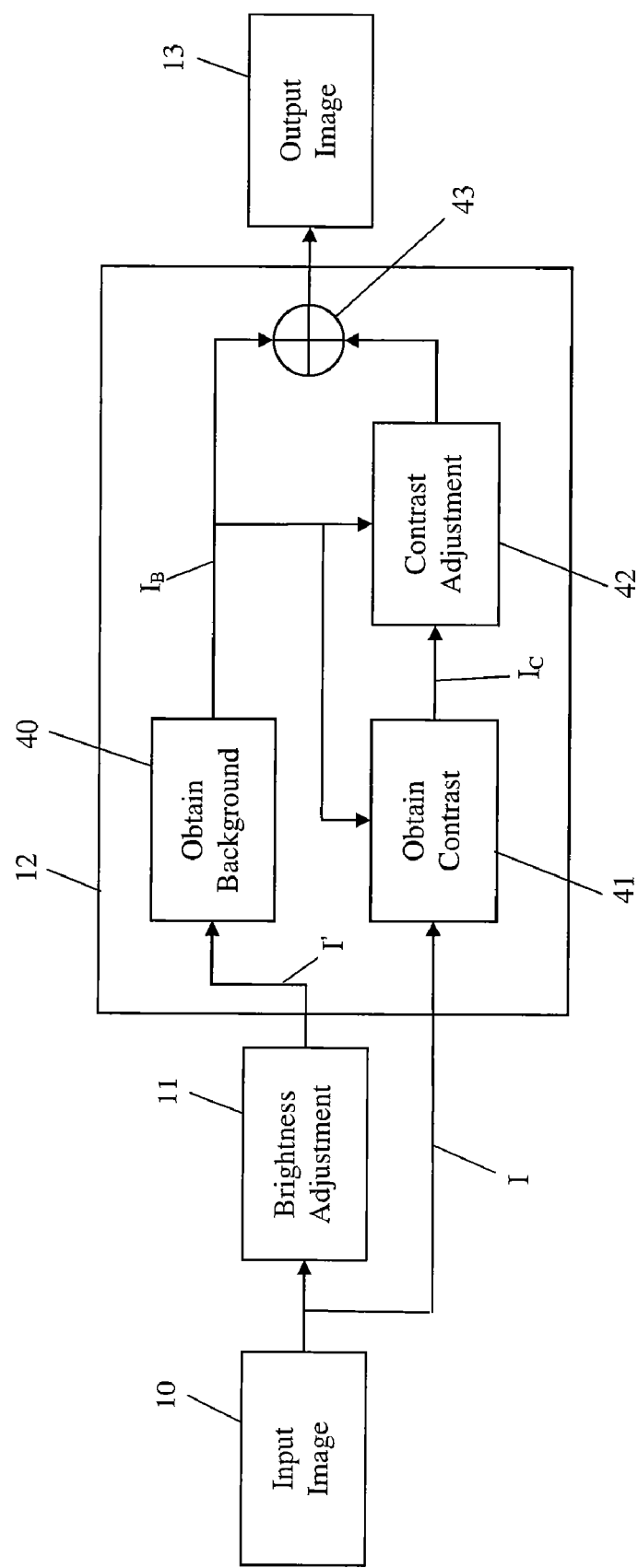
FIG. 4 is a schematic block diagram showing more detail of a contrast adjustment step.
Figure 5:
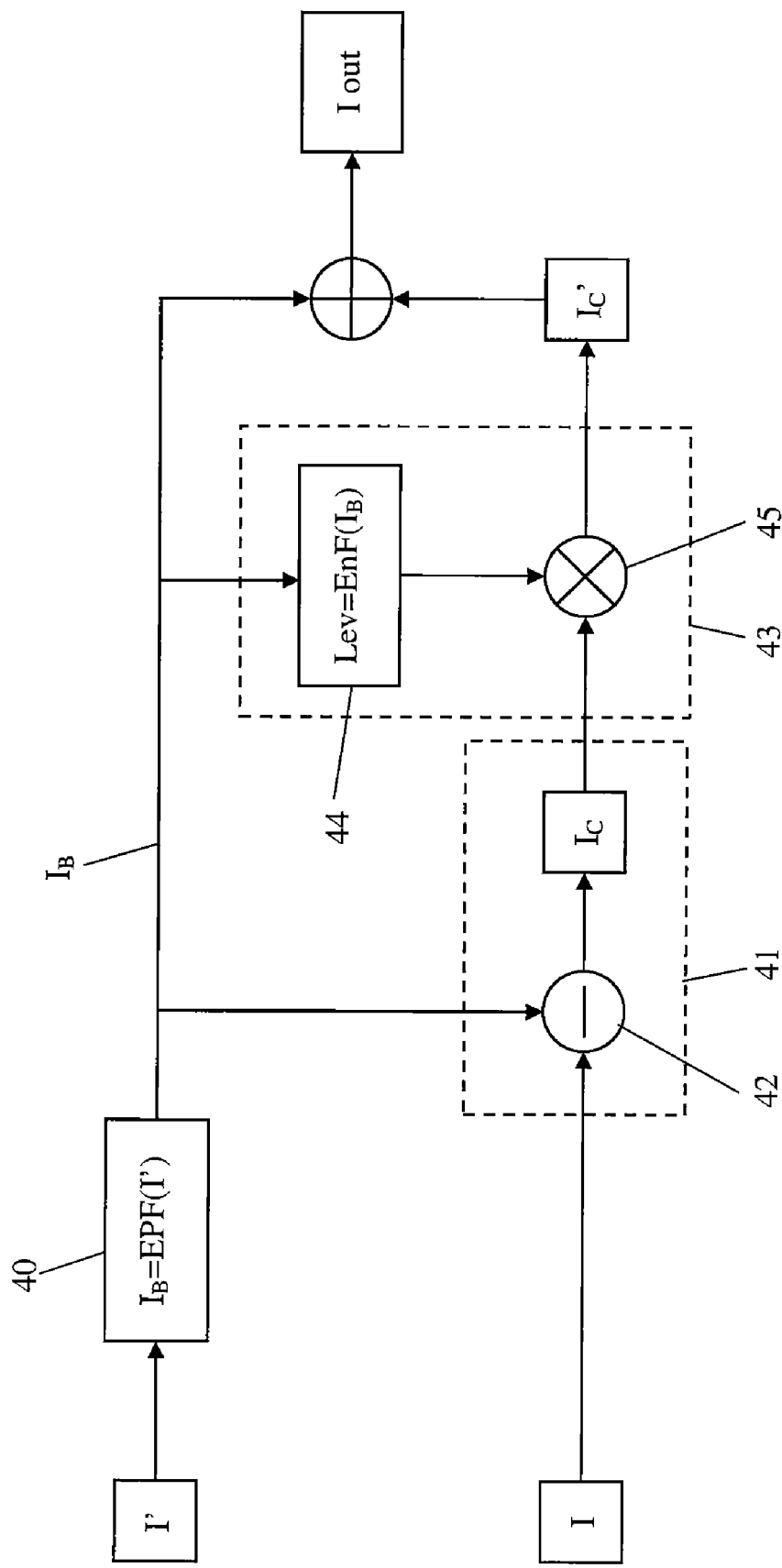
FIG. 5 is a functional block diagram of contrast adjustment.

FIGS. 4 and 5 illustrate contrast adjustment of the brightness adjusted image I'. The adjusted image I' is split in to its high and low frequency components $I_B$ and $I_C$. The high frequency contrast component $I_C$ is adjusted based on the low frequency background component $I_B$. Firstly the low frequency background component $I_B$ is obtained 40 by applying an edge-preserved low pass filter (EPF) to the brightness adjusted image I'. The high frequency contrast component $I_C$ is then obtained 41 by removing the image background $I_B$ from the original input image I using a subtractor 42.

The high frequency contrast component $I_C$ then undergoes contrast adjustment 43. A contrast adjustment level (Lev) is determined based on the image background component $I_B$ using a contrast enhancement function (EnF). The adjustment level (Lev) is constrained between empirically determined minimum and maximum limits. The equation for the adjustment level is:

$$\text{Lev}=(\text{Lev}_{max}-\text{Lev}_{min})\times I_B+\text{Lev}_{min}$$

where $\text{Lev}_{max}$ and $\text{Lev}_{min}$ are the empirically determined maximum and minimum limits of the adjustment level.

The high frequency contrast component $I_C$ of the image is adjusted by the adjustment level (Lev) at a product block 45. The final enhanced output image 13 is then obtained by adding the background component $I_B$ to the adjusted contrast component $I_C$ at an addition block 43.

Various functions and equations have been described which are not intended to limit the scope of use or functionality of the invention. Equivalent functions and equations and variations of the method obvious to those skilled may also be used in the invention.

What is claimed is:

1. A digital image enhancement method comprising:
    adjusting the brightness of an input image to obtain a brightness adjusted image,
    extracting background information ($I_B$) from the brightness adjusted image with an edge-preserve filter,
    extracting contrast information from the brightness adjusted image,
    adjusting the contrast information, which further comprises multiplying the contrast information by a contrast adjustment factor, the contrast adjustment factor using the equation:

$$\text{Lev}=(\text{Lev}_{max}-\text{Lev}_{min})\times I_B+\text{Lev}_{min}$$

where Lev is the contrast adjustment factor, and $\text{Lev}_{max}$ and $\text{Lev}_{mm}$ are maximum and minimum limits of the contrast adjustment factor respectively, and
    combining the background information and adjusted contrast information to obtain an output image.

2. The method of claim 1 wherein adjusting the brightness of the input image to obtain the brightness adjusted image comprises computing an adjusted dynamic range for the input image, obtaining the brightness adjusted image using the adjusted dynamic range, and compressing the dynamic range of the brightness adjusted image.

3. The method of claim 2 wherein obtaining the brightness adjusted image using the adjusted dynamic range comprises obtaining the brightness adjusted image using a function including factors for the adjusted dynamic range and a minimum luminance.

4. The method of claim 3 wherein obtaining the brightness adjusted image uses an equation:

$$I_{adj}=\text{Exp}(D_{adj}\times S)-1+\tau$$

where $I_{adj}$ is the brightness adjusted image, S is a scaling factor for the adjusted dynamic range, $D_{adj}$ is the adjusted dynamic range of the image, and $\tau$ controls the minimum luminance.

5. The method of claim 4 wherein S is in a range from 6 to 8.

6. The method of claim 3 wherein obtaining the brightness adjusted image further comprises quantizing the dynamic range of the brightness adjusted image after compressing the dynamic range of the brightness adjusted image.

7. The method of claim 6 wherein compressing the dynamic range comprises compressing using a function $I'=\log(I_{adj})$, where Iadj is the brightness adjusted image.

8. The method of claim 6 wherein quantization of the image comprises quantizing to 256 discrete values.

9. The method of claim 1 wherein extracting contrast information of the brightness adjusted image comprises removing the background information from the input image using a subtractor.

10. The method of claim 1 wherein the contrast adjustment factor is a function of the background information.

11. A digital image enhancement method, for correcting the contrast of an input image, comprising:
    extracting background information ($I_B$) of the input image with an edge-preserve filter,
    extracting contrast information of the input image,
    adjusting the contrast information, which further comprises multiplying the contrast information by a contrast adjustment factor, the contrast adjustment factor using the equation:

$$\text{Lev}=(\text{Lev}_{max}-\text{Lev}_{min})\times I_B+\text{Lev}_{min}$$

where Lev is the contrast adjustment factor, and $\text{Lev}_{max}$ and $\text{Lev}_{min}$ are maximum and minimum limits of the contrast adjustment factor respectively, and
    combining the background information and adjusted contrast information to obtain an output image.

12. The method of claim 11 wherein extracting contrast information of the input image comprises removing the background information from the input image using a subtractor.

* * * * *